Patented Oct. 20, 1925.

1,558,175

UNITED STATES PATENT OFFICE.

FREDERICK WILLIAM JONES, JR., OF CROYDON, ENGLAND, ASSIGNOR TO COLUMBIA GRAPHOPHONE COMPANY, LIMITED, OF LONDON, ENGLAND.

MANUFACTURE OF GRAMOPHONE DISK RECORDS.

No Drawing.   Application filed October 15, 1923.   Serial No. 668,739.

*To all whom it may concern:*

Be it known that I, FREDERICK WILLIAM JONES, Junior, a subject of the King of Great Britain and Ireland, and residing at 25 Park Hill Rise, Croydon, in the county of Surrey, England, have invented certain new and useful Improvements in the Manufacture of Gramophone Disk Records, of which the following is a specification.

This invention relates to the manufacture of homogeneous disk gramophone records from thermoplastic material, it being understood that by homogeneous disk records I mean records of the disk form made of the same thermoplastic material throughout as distinguished from the laminated disks which have surface layers of a composition differing from that between these surfaces, and by thermoplastic material I mean a material which is mouldable under the application of heat and pressure.

In the production of homogeneous disk gramophone records it has hitherto been the practice to mould the same from thermoplastic material with the aid of heat and pressure in a suitable mould in which are fitted the matrices having on their surfaces the sound record, one or other of two methods of manufacture, which may be termed the "dough" and the "plate" methods respectively, being adopted. According to the "dough" method the thermoplastic material is heated until it is of about the consistency of putty so that it is mouldable under slight pressure and a ball or lump of the material in this condition is placed between the previously heated matrices in the mould and the whole submitted to pressure, being cooled meanwhile.

According to the "plate" method the thermoplastic material is formed into compact sheets from which plates are cut approximately to the size of the finished record, these plates being then heated and placed between the heated matrices and submitted to the same operations as those described with reference to the "dough" method.

When making homogeneous disk records from a thermoplastic material having a base of cellulose acetate I have found that the resulting record is not satisfactory when made by either the "dough" or the "plate" method. With the former the surface of the record has a bad appearance and does not wear uniformly owing to the unequal heating of the plastic material and the lack of uniformity of the composition possibly brought about by the varying degree of decomposition of the cellulose acetate consequent upon excessive and irregular heating.

Moreover, during the process of manufacture air is imprisoned within the record and forms cavities therein which when the record is stored under adverse climatic conditions sometimes develop into rugosities and blisters upon the surface. With the "plate" method I find that air becomes imprisoned between the ridges of the matrices during the process of manufacture and this imprisoned air seriously impairs the sound record which exists on the edges of the grooves in the finished record.

I have found that these defects are completely eliminated when the heating of the thermoplastic material is reduced to the minimum possible and the pressure applied in the moulds when the material is in a porous condition so that it allows the air between the matrices to escape readily during the pressing operation otherwise than between the surfaces of the matrices and the record, and the present invention is based upon this discovery.

The invention consists in a method of forming homogeneous gramophone disk records from a thermoplastic material according to which such material is employed in a powdered form and is suitably treated to cause the powder to cohere to form a disk or plate.

The invention also consists in a method of forming porous disks for the manufacture of homogeneous disk gramophone records from a thermoplastic material which consists in feeding powdered material on to a plate or other support heated to a temperature at which the powder can be made to cohere under pressure and subjecting the powdered material to pressure by means of a cold roller or other pressing device.

The invention also consists in a method of forming homogeneous gramophone disk records which consists in feeding powdered thermoplastic material into a mould containing the record-forming matrices, subjecting the material in the mould to pressure and sufficient heat to cause the powder to cohere and then cooling the mould.

The invention also consists in other details and arrangements hereinafter described or indicated.

In carrying my invention into effect in one convenient manner I prepare in any suitable or known manner a thermoplastic material of suitable character as, for example, a material having a base of cellulose acetate, and this material I reduce to a powdered state until it passes a sieve of, say, forty meshes to the inch. The powder is then fed on to a circular metal plate of a size determined by the diameter of record to be produced, which plate is heated to a temperature at which the powder can be made to cohere under pressure whereupon the material on the plate is submitted to pressure from a cold roller or other pressing device. The plate is then cooled and in this manner I produce a porous disk which may either be used at once or stored for the manufacture of a record.

A plate prepared in this manner possesses advantages additional to those imparted by its porosity due to the fact that the disk is cold rolled which produces on that side to which the roller is applied a clean surface which has been subjected to very little heat, and when this side is employed it will be found suitable for the production of high grade records.

According to an alternative method of preparing the powdered disk I feed into a suitable mold sufficient powder to form a disk of any predetermined weight and apply pressure sufficient to attain the necessary cohesion thus producing a porous powder disk ready for the manufacture of gramophone records in the moulds under heat as hereafter described.

In producing records from these powder disks I may proceed as follows:—The open mould with the matrices in position is heated on a hot table or by other suitable means to the requisite temperature, a powder disk is then placed on each matrix and allowed to remain for a few seconds to acquire the temperature of the mould whereupon the mould is closed and placed in the press where it is rapidly cooled under pressure.

Instead of using the powder disks for the preparation of the record the powdered thermoplastic material may be fed direct into a mould containing the matrices and capable of being heated and cooled while under pressure so that in this way the records may be prepared from the powdered thermoplastic material in one operation without the necessity for previously preparing the porous disk.

It will be understood that as the essential feature of my invention consists in the formation of a homogeneous disk record by the employment of powdered thermoplastic material I do not desire to restrict my invention to any particular thermoplastic composition or material nor to the particular methods described for utilizing the same in its powdered form for the production of homogeneous disk records, and it will be evident that I may modify the means adopted for cohering the powder to form a porous disk and the nature and construction of the apparatus employed depending upon the character or quality of the material used and of the records to be made or any practical requirements that may have to be fulfilled.

The following is an example of a composition suitable for making records:

| | Per cent. |
|---|---|
| Cellulose acetate | 30 |
| Gelatinizer | 15 |
| Acaroid resin | 5 |
| Barytes | 20 |
| Silica | 26 |
| Vegetable black | 4 |

Having now described my invention what I claim as new and desire to secure by Letters Patent is:—

1. A gramophone disk record formed under the influence of pressure from one or more porous disks of a thermoplastic material.

2. A gramophone disk record formed under the influence of heat and pressure from one or more porous disks of a thermoplastic material.

3. A gramophone disk record formed under the influence of heat and pressure from one or more disks of thermoplastic material, said disks being in the form of a porously coherent powder.

4. A gramophone disk record plate formed wholly from a powdered thermoplastic material having a base of cellulose acetate made to cohere by suitable treatment.

5. A gramophone disk record formed from a plate composed wholly of a powdered thermoplastic material having a base of cellulose acetate made to cohere by suitable treatment and having a sound record impressed thereon.

6. A gramophone disk record formed under the influence of pressure from one or more porous disks of a thermoplastic material having a base of cellulose acetate.

7. A method of forming homogeneous plates for gramophone disk records which consists in feeding powdered thermoplastic material on to a plate of suitable size, heating the plate to a temperature at which the powder can be made to cohere and subjecting the powder to pressure to produce a porous disk.

8. A method of forming plates for gramophone disk records which consists in feeding powdered thermoplastic material on to a plate of suitable size, heating the plate to a temperature at which the powder may be made to cohere and subjecting the powder to pressure by means of a cold roller to produce a porous disk.

9. A method of forming gramophone disk records which consists in forming a porous plate in the manner set out in claim 5 and subsequently impressing a sound record thereon.

10. A method of forming homogeneous gramophone disk records which consists in feeding powdered thermoplastic material into a mould containing the record forming matrices, subjecting the powdered material in the mould to pressure and sufficient heat to form a porous disk record and then cooling the mould.

11. A method of forming plate for homogeneous gramophone disk records which consists in feeding powdered thermoplastic material having a base of cellulose acetate on to a plate of suitable size, heating the plate to a temperature at which the powder can be made to cohere and subjecting the powder to pressure to produce a porous plate.

12. A method of forming homogeneous gramophone disk records which consists in feeding powdered thermoplastic material having a base of cellulose acetate into a mould containing the record forming matrices subjecting the powdered material in the mould to pressure and sufficient heat to form a porous disk record and then cooling the mould.

In testimony whereof I have signed my name to this specification.

FREDERICK WILLIAM JONES, Junior.